US008370628B2

United States Patent
Mundy et al.

(10) Patent No.: US 8,370,628 B2
(45) Date of Patent: Feb. 5, 2013

(54) DOCUMENT COLLABORATION SYSTEM WITH ALTERNATIVE VIEWS

(75) Inventors: Kiran Mundy, Lexington, MA (US); Sivakumar Sundaresan, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 372 days.

(21) Appl. No.: 12/503,986

(22) Filed: Jul. 16, 2009

(65) Prior Publication Data
US 2011/0016387 A1 Jan. 20, 2011

(51) Int. Cl.
*G06F 21/00* (2006.01)
(52) U.S. Cl. ........ 713/165; 707/608; 715/255; 715/741; 715/751
(58) Field of Classification Search .................. 713/165; 707/608, E17.005; 715/151, 255, 741; 709/201
See application file for complete search history.

(56) References Cited

U.S. PATENT DOCUMENTS

| | | | | |
|---|---|---|---|---|
| 7,072,940 | B1 * | 7/2006 | Day et al. ........................ | 709/204 |
| 7,124,362 | B2 | 10/2006 | Tischer | |
| 7,496,841 | B2 | 2/2009 | Hadfield et al. | |
| 7,908,323 | B2 * | 3/2011 | Lim ............................... | 709/205 |
| 7,930,642 | B1 * | 4/2011 | Gerde et al. .................. | 715/764 |
| 2002/0065848 | A1 * | 5/2002 | Walker et al. ................. | 707/511 |
| 2003/0112273 | A1 * | 6/2003 | Hadfield et al. ............. | 345/751 |
| 2004/0044958 | A1 * | 3/2004 | Wolf et al. .................... | 715/513 |
| 2004/0085354 | A1 | 5/2004 | Massand | |
| 2006/0026502 | A1 | 2/2006 | Dutta | |
| 2008/0059539 | A1 | 3/2008 | Chin et al. | |
| 2008/0104508 | A1 * | 5/2008 | Lumley et al. ................ | 715/255 |
| 2009/0249178 | A1 * | 10/2009 | Ambrosino et al. .......... | 715/205 |
| 2009/0249224 | A1 * | 10/2009 | Davis et al. ................... | 715/753 |
| 2009/0271696 | A1 * | 10/2009 | Bailor et al. .................. | 715/229 |
| 2010/0198871 | A1 * | 8/2010 | Stiegler et al. ................ | 707/783 |

OTHER PUBLICATIONS

Preston et al.; "An Efficient Synchronous Collaborative Editing System Employing Dynamic Locking of Varying Granularity in Generalized Document Trees"; 2008 IEEE; http://ieeexplore.ieee.org/xpl/freeabs_all.jsp?arnumber=4207530.
"Analysis Selection, and Implementation of Electronic Document Managment Systems (EDMS)"; AIIM; Silver Spring, MD 20910-5603; Apr. 1, 2007; www.sos.ca.gov/archives/pdf/AIIM%20APR1-2007.pdf; pp. i-47.
Virtual Documentss V1.O'; Antioch Software; Oct. 30, 2008; http://www.filebuzz.com/fileinfo/51809/Virtual_Documents.html; pp. 1-2.
"A VIP Task Manager Standard Edition V2.81"; VIP Quality Software, Ltd.; Jul. 3, 2007; http://www.filebuzz.com/fileinfo/19761/A_VIP_Task_Manager_Standard_Edition.htm. pp. 1-2.
"Live Project Project Collaboration V2.3"; KaDonk, Inc.; Feb. 5, 2008; http://www.filebuzz.com/fileinfo/40185/LiveProject_Project_Collaboration.html: pp. 1-3.
Docsvault Small Business V2.0; Easy Data Access; Nov. 21, 2007; http://www.filebuzz.com/fileinfo/39695/Docsvault_Small_Business.html; pp. 1-3.

(Continued)

*Primary Examiner* — Hadi Armouche
(74) *Attorney, Agent, or Firm* — Squire Sanders (US) LLP

(57) ABSTRACT

A system provides document collaboration for a plurality of users. The system divides a central document into a plurality of sections. The system then assigns edit rights for a user for one or more sections, and read-only rights for the user for one or more sections. The system then generates a customized document for the user that includes the edit rights sections and the read-only rights sections.

20 Claims, 4 Drawing Sheets

OTHER PUBLICATIONS

Abilitics; 2008; http://www.abilitics.com/Content/Solutions/CollaborationAndTeamwork.aspx; p. 1.

"Documents Sharing"; HyperOffice.com; 2008; http://www.intranetbuyersguide.com/hypermain/document_sharing.cfm?menuset=solutions; p. 1.

"Groupdrive Collaboration Suite"; South river Technologies, Inc.; 2008; http://www.southrivertech.com/products/groupdrive/index.html; p. 1.

"New Features in Google Docs"; Google.com; downloaded Feb. 13, 2009; http://www.google.com/google-d-s-whatsnew.html; pp. 1-11.

"New Features in IBM Workplace Collaboration Servces 2.5"; IBM; May 24, 2005; http://www.ibm.com/developerworks/lotus/library/wcs25-newfeatures/; pp. 1-6.

"MAC-Friendly.PC-Friendly.Just Plain Friendly."; iWork.com; downloaded Feb. 13, 2009; http://www.apple.com/iwork/iwork-dot-com/; pp. 1-2.

"Xythos Enterprise Document Management Suite"; Xythos software, inc.; San Francisco, CA 94111; http://www.princeton.edu/as/bbfaq/XythosEnterpriseDocumentManagementSuite7Brochure.pdf, Oct. 2008.

* cited by examiner

DOCUMENT COLLABORATION SYSTEM WITH ALTERNATIVE VIEWS

FIELD

One embodiment is directed generally to a computer system, and in particular to a computer system that provides document collaboration.

BACKGROUND INFORMATION

Users of word processing software typically generate an original document on their computer and save it to some destination file or folder. Creating and storing documents in this environment is a fairly efficient process, until changes need to be made to a document, or until the document needs to be shared. Changes for a shared document, including such edits as insertion, deletion, or replacement functions, are difficult to synchronize among users.

Conventional document collaboration technologies can be very challenging in terms of tracking changes to an original document, tracking which users did what, which users have what versions, etc. Most known document collaboration systems typically treat a document as a single entity, and this leads to a proliferation of overlapping documents which rapidly start falling out of step with one another.

SUMMARY

One embodiment is a system that provides document collaboration for a plurality of users. The system divides a central document into a plurality of sections. The system then assigns edit rights for a user for one or more sections, and read-only rights for the user for one or more sections. The system then generates a customized document for the user that includes the edit rights sections and the read-only rights sections.

DETAILED DESCRIPTION

One embodiment is a document collaboration system that provides collaboration for a document by dividing a document into multiple sections. For each section, a single user can be granted edit rights, and multiple users can be granted read-only rights. Each user may be provided a customized/alternate view/copy of the document that includes only the sections for which the user has edit or read-only rights. Edits made by a user to a section can be quickly reflected in the copies of the section that are viewed by other users.

Figure 1:
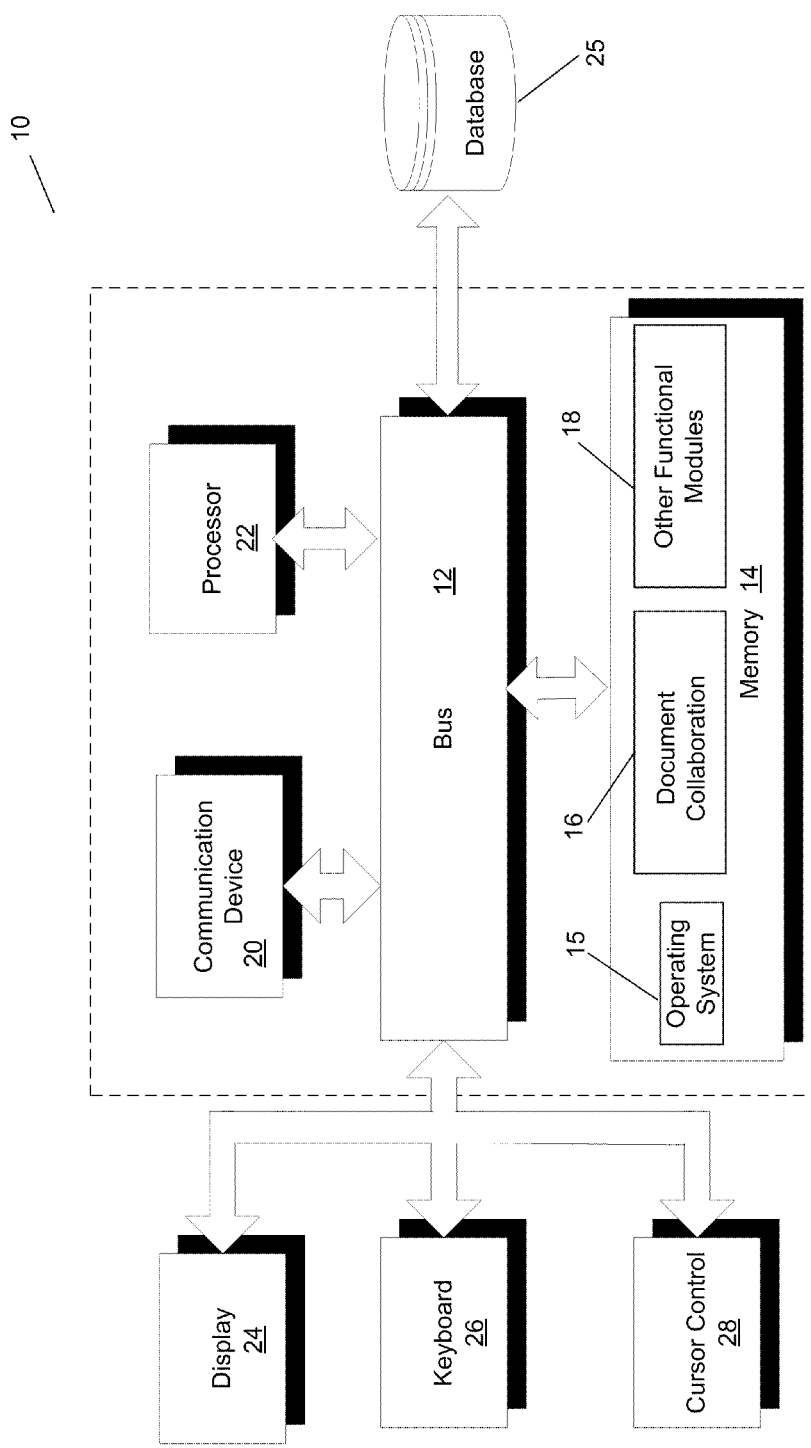
FIG. 1 is a block diagram of a document collaboration system that can implement an embodiment of the present invention.

FIG. 1 is a block diagram of a document collaboration system 10 that can implement an embodiment of the present invention. System/server 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10. A database 25 provides for a central storage of documents and other data.

In one embodiment, memory 14 stores software modules that provide functionality when executed by processor 22. The modules include an operating system 15 that provides operating system functionality for system 10. The modules further include a document collaboration module 16 that performs document collaboration using sections of a document as disclosed in more detail below. System 10 may be a part of or may interact with additional functional modules, such as a word processor or any application that allows a file to be edited, such as the Extensible Markup Language ("XML") Publisher from ORACLE CORP. Therefore, system 10 will typically include one or more additional functional modules 18 to include the additional functionality.

Figure 2:
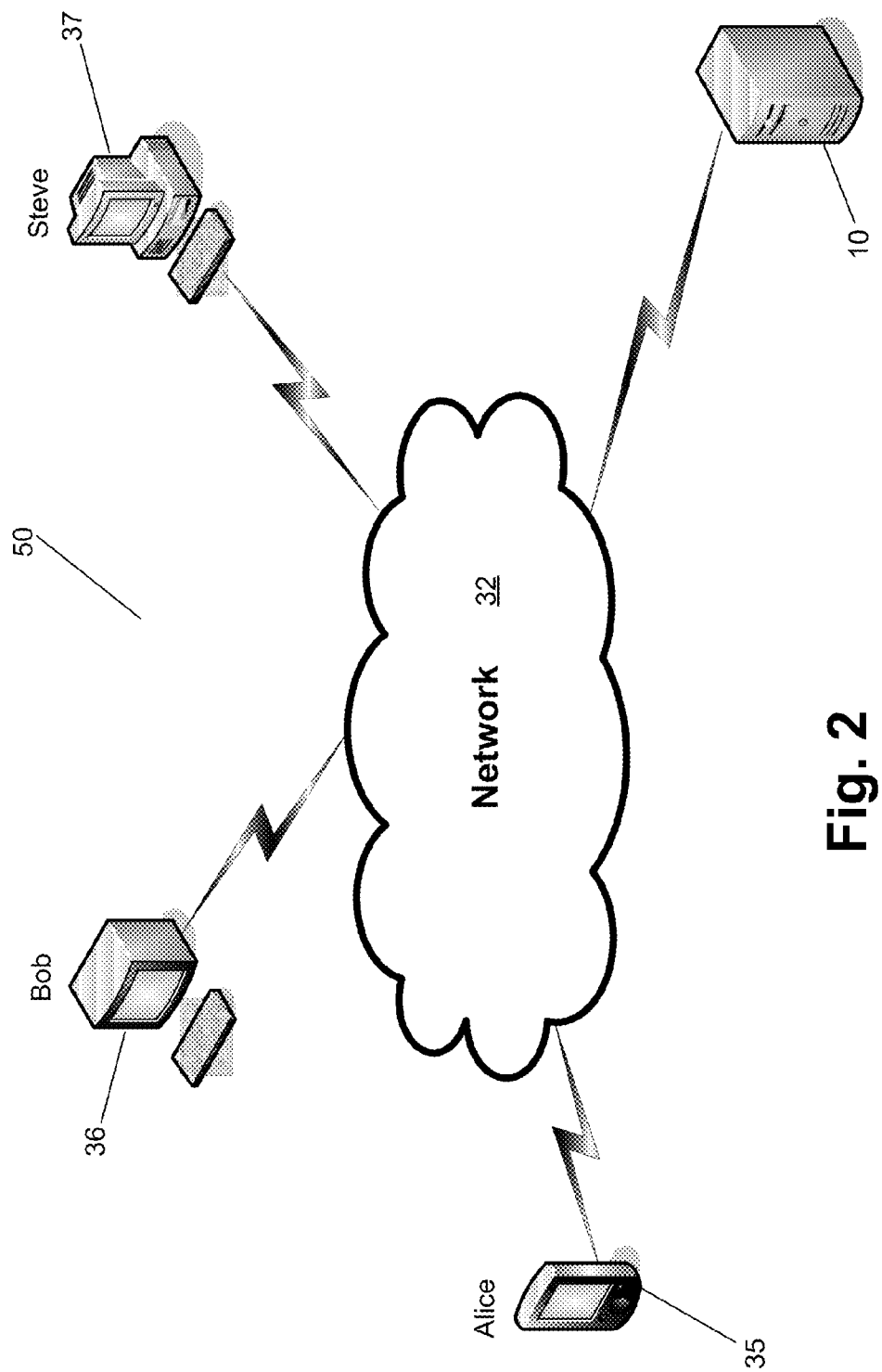
FIG. 2 is an overview block diagram of a networked system that includes the document collaboration system in accordance with one embodiment.

FIG. 2 is an overview block diagram of a networked system 50 that includes document collaboration system 10 in accordance with one embodiment. System 50 includes terminals 35-37 that are communicatively coupled to server 10 via a network 32. Network 32 may be any known type of network, including the Internet, a wireless network, a local network, etc. Terminals 35-37 may be coupled to server 10 via any method that allows terminals 35-37 to transmit and receive data from server 10. The coupling can be via a network as shown in FIG. 2, or it can be a direct connection. Terminals 35-37 may be any known device that allow a user to edit and/or view a document. As shown in FIG. 2, terminal 35, used by "Alice", is a smart phone. Terminal 36, used by "Bob", is a non-intelligent terminal (i.e., its primary purpose is to provide communication with server 10). Terminal 37, used by "Steve", is a general purpose computer. Terminals 35-37 may include word processing and other processing capabilities, or may remotely access these functionalities on system 10 in a "cloud computing" environment. Terminals 35-37 may include all or some of the elements that are included in server 10 shown in FIG. 1.

Figure 3:
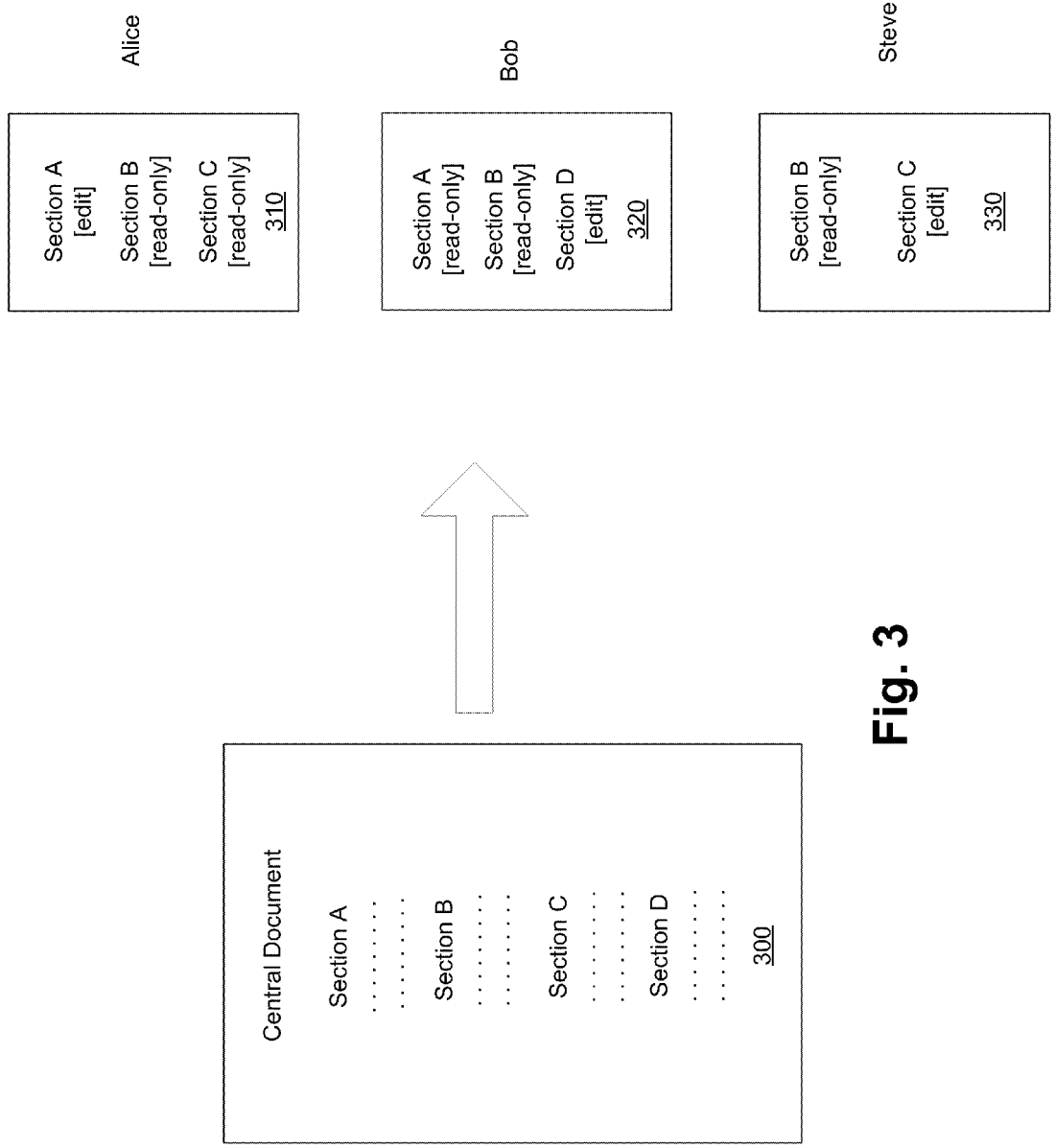
FIG. 3 illustrates an example central document divided into four sections in accordance with one embodiment.

In one embodiment, a central document is stored on server 10. The central document is divided up into multiple sections. FIG. 3 illustrates an example central document 300 divided into four sections: Section A, Section B, Section C and Section D. The sections can be divided using any type of criteria, for example, by subject matter, by original author, by date, etc. Each section can vary in size from as small as one word to multiple pages of paragraphs or larger.

One user is assigned or marked as an "owner" of each section. Being assigned as an owner gives that user the right to edit that section. "Editing" a section includes revising, deleting, adding, etc. In one embodiment, a section will only be assigned a single "owner". A user can claim ownership of one or more sections in one embodiment by sending a request to system 10. If that section is available (i.e., it has not yet been assigned to another user), ownership will be granted. In another embodiment, the overall "owner" of central document 300 may assign ownership status to each section without waiting for a request from a user. The user can use any type of word processing software to edit the document, such as WORD from MICROSOFT CORP. The word processing software can be stored locally in the user's terminal, or accessed remotely from system 10, or some other means.

A user may request or may be granted a "shared view" or "read-only" view to any other section that is not already owned by the user. Because a user may not be interested in all of the sections of document 300, the user may request a read-only view of only the sections that the user has an interest in, and choose to ignore other sections. As with the owned section, the read-only designation may be issued on request or may be granted by the overall owner of central document 300.

System 10 maintains and stores a table for document 300 regarding the rights for each user for each section. As an example, Table 1 below stores the rights for document 300. As shown in Table 1, some sections (e.g., Section B) may not have edit rights assigned if no user has requested the rights or the overall owner of document 300 has not assigned the rights. Further, some sections may have multiple users with read-only rights (e.g., Section B) or no users with read-only rights (e.g., Section D).

TABLE 1

Document 300

| Section | Edit Rights | Read-Only Rights |
|---------|-------------|------------------|
| A | Alice | Bob |
| B |  | Alice, Bob, Steve |
| C | Steve | Alice |
| D | Bob |  |

System 10 generates a customized copy or alternate view of central document 300 for each user. The customized copy for each user includes the user's edit rights section or sections (if there are any) and the user's read-only rights section or sections (if there are any). The customized copy is accessible by the user at the user's respective terminal 35-37 by either transmitting a copy to the user or storing the customized copy on system 10 and providing remote access to the user. Therefore, each user may have an alternate view of central document 300 that includes only the sections that the user can edit or is interested in viewing. For example, as shown in FIG. 3, Alice will receive and work on customized document 310, Bob will receive customized document 320, and Steve will receive customized document 330. As shown, customized documents 310, 320 and 330 do not include all sections of central document 300.

In one embodiment, the user that owns a section can edit that section. All edits to the section will be reflected in central document 300. As edits to the section are made, other users that have read-only rights to that section will have their customized copy of the document updated to reflect the edits in the section. In one embodiment, the updates can occur approximately instantaneously as they are transmitted from the editing user to server 10 and back to the read-only users. In other embodiments, the read-only users may get a message to "refresh" their document when edits are available so that the changes to the section can be transmitted from server 10 to the user's terminal.

In one embodiment, a user that has edit rights to a section can change the format (e.g., font, color, underlining, etc.) for that section. The formatting changes will be saved so they are reflected in that user's view of the section (i.e., in the customized copy). However, the formatting changes will not be implemented or saved in central document 300. Therefore, the formatting for central document 300 will remain consistent for all of the sections and for all of the users.

In one embodiment, metadata can be stored for one or more sections of the central document. The metadata can give a general description of the content of each section. For example, metadata for one section may state that the section should describe how a widget is built. The user with edit rights for that document can then review the metadata to make sure the their edits do not cause the section to stray from the overall document or the stated content for that section.

Figure 4:
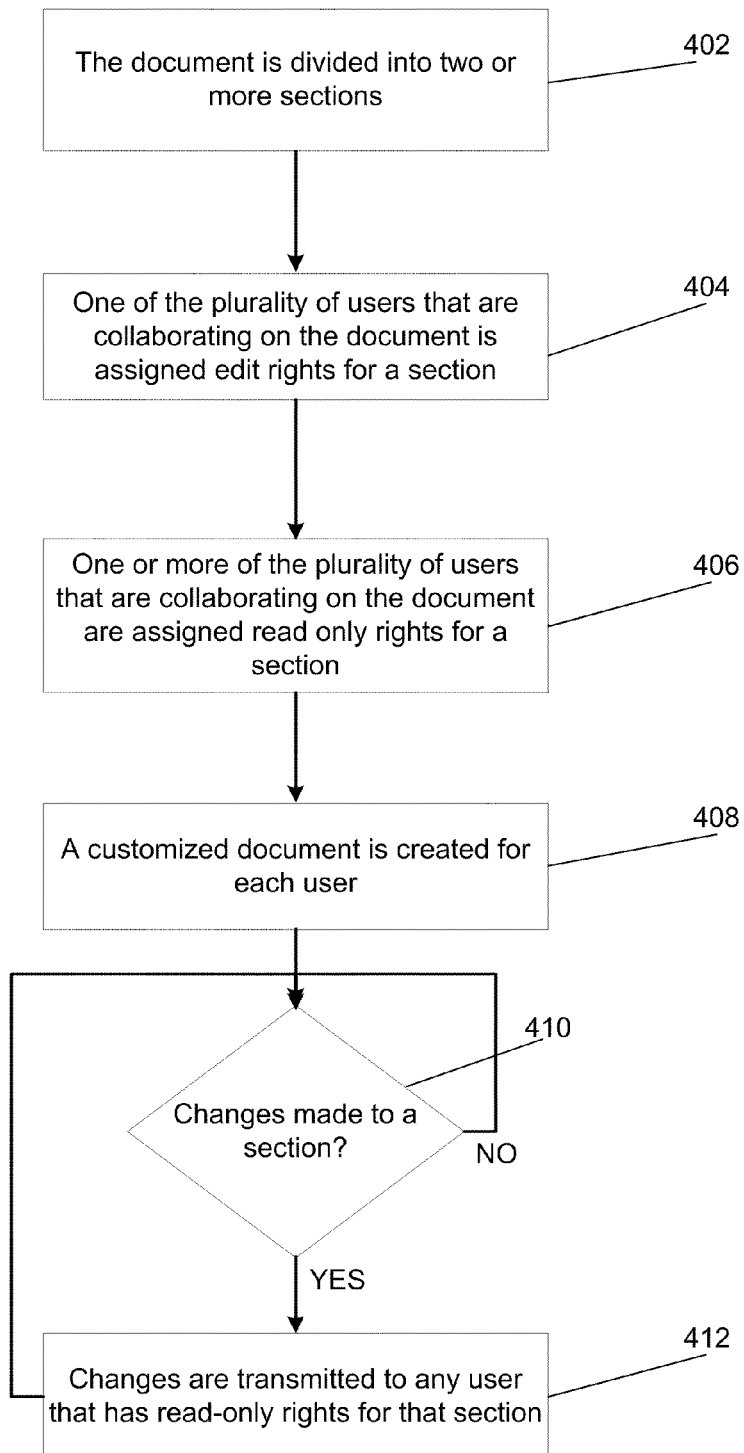
FIG. 4 is a flow diagram of the functionality of the document collaboration system when providing collaboration by a plurality of users for a central document in accordance with one embodiment.

FIG. 4 is a is a flow diagram of the functionality of document collaboration 16 when providing collaboration by a plurality of users for a central document in accordance with one embodiment. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, the document is divided into two or more sections.

At 404, one of the plurality of users that are collaborating on the document is assigned edit rights for a section. The assignment can be in response to a user request, or can be done by an owner of the central document. In one embodiment, at most one user has edit rights for each section. Edit rights allow the user to edit the respective section. Edit rights for each remaining section may be assigned to one of the users.

At 406, one or more of the plurality of users that are collaborating on the document are assigned read-only rights for a section. The assignment can be in response to a user request, or can be done by an owner of the central document. In one embodiment, more than one user can have read-only rights for each section. The remaining sections can also have users assigned read-only rights.

At 408, a customized document is created for each user. The customized document includes the section (if any) for which the user has edit rights, and the one or more sections (if any) for which the user has read-only rights.

At 410, it is determined if a user has made any changes to a section. If yes at 410, the changes are incorporated in the central document, and the changes are transmitted to any user that has read-only rights for that section at 412. The changes can be transmitted in real-time or, for example, by requesting the user to refresh their document view. The changes are then incorporated into the user's customized copy. The functionality then continues at 410. If no at 410, the functionality continues at 410 until a change is received.

As disclosed, embodiments break a central document into sections and assign edit rights for each section to one user. Each user can be assigned read-only rights to sections that they do not have edit rights. Each user then gets a customized copy of the document that includes the edit section and one or more read-only sections. All edits are reflected in the customized copies. Therefore, only one user can edit a section, thus avoiding synchronization problems, and users can view up-to-date edits for sections that they are interested in, and can easily ignore sections that they are not interested in.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to provide document collaboration for a plurality of users, the instructions comprising:
   dividing a central document into a plurality of sections at the processor;
   assigning edit rights for a first user to a first editable section of the plurality of sections and assigning edit rights for a second user to a second editable section of the plurality of sections;
   assigning read-only rights for the first user to the second editable section;
   generating a first customized document for the first user that comprises the first editable section and the second editable section, wherein the first customized document comprises all sections of the plurality of sections for which the first user has edits rights or read-only rights;
   receiving a plurality of edits by the processor from the second user on the second editable section, wherein each edit is automatically received by the processor as the edit is made by the second user; and
   updating the second editable section on the first customized document to reflect the plurality of edits from the second user;
   wherein the updating occurs by automatically transmitting to the first customized document each edit of the plurality of edits on the second editable section when it is received by the processor and each edit is transmitted to all users with read-only rights for the second editable section.

2. The computer readable medium of claim 1, wherein at most one user is assigned edit rights to each of the plurality of sections.

3. The computer readable medium of claim 1, wherein one or more users are assigned read-only rights to one or more of the plurality of sections.

4. The computer readable medium of claim 1, the instructions further comprising:
   assigning edit rights for the second user to a third section;
   assigning read-only rights for the second user to a fourth section; and
   generating a second custom document for the second user that comprises the third section and the fourth section.

5. The computer readable medium of claim 1, wherein the updating comprises transmitting the edits to users that are assigned read-only rights for the second sections.

6. The computer readable medium of claim 1, wherein the transmitting comprises incorporating the edits in the first customized document.

7. The computer readable medium of claim 1, wherein the first customized document and the central document are stored in a central database.

8. The computer readable medium of claim 1, wherein central document is stored in a central database and the first customized document is stored on a system that is local to the first user.

9. A document collaboration system comprising:
   a processor;
   a database coupled to the processor that stores a central document;
   memory coupled to the processor for storing instructions that, when executed by the processor, divide the central document into a plurality of sections, and for each section, assign edit rights to zero or one user, and assign read-only rights to zero or more users;
   create a first customized document for a first user, wherein the first customized document comprises the first sections that the first user is assigned edit rights, and the second sections that the first user is assigned read-only rights, wherein the first customized document comprises all sections of the plurality of sections for which the first user has edits rights or read-only rights;
   receive a plurality of edits from a second user on the second sections, wherein each edit of the plurality of edits is automatically received by the processor as the edit is made by the second user; and
   update the second sections on the first customized document to reflect the plurality of edits from the second user;
   wherein the update occurs by automatically transmitting to the first customized document each edit of the plurality of edits on the second editable section when it is received by the processor and each edit is transmitted to all users with read-only rights for the second editable section.

10. The document collaboration system of claim 9, wherein the update comprises transmitting the edits to users that are assigned read-only rights for the second sections.

11. The document collaboration system of claim 9, the instructions when executed further comprise:
    create a second customized document for the second user, wherein the second customized document comprises one or more third sections that the second user is assigned edit rights, and one or more fourth sections that the second user is assigned read-only rights.

12. A computer implemented method of document collaboration for a plurality of users, the method comprising:
    dividing by a processor a central document into a plurality of sections;
    assigning by the processor edit rights for a first user to a first editable section of the plurality of sections and assigning edit rights for a second user to a second editable section of the plurality of sections;
    assigning by the processor read-only rights for the first user to the second editable section;
    generating by the processor a first customized document for the first user that comprises the first editable section and the second editable section, wherein the first customized document comprises all sections of the plurality of sections for which the first user has edits rights or read-only rights;
    receiving a plurality of edits by the processor from the second user on the second editable section, wherein each edit of the plurality of edits is automatically received by the processor as the edit is made by the second user; and
    updating the second editable section on the first customized document to reflect the plurality of edits from the second user;
    wherein the updating occurs by automatically transmitting to the first customized document each edit of the plurality of edits on the second editable section when it is received by the processor and each edit is transmitted to all users with read-only rights for the second editable section.

13. The method of claim 12, further comprising:
assigning edit rights for the second user to a third section;
assigning read-only rights for the second user to a fourth section; and
generating a second custom document for the second user that comprises the third section and the fourth section.

14. The method of claim 12, wherein the updating comprises transmitting the edits to users that are assigned read-only rights for the second sections.

15. The computer readable medium of claim 1, further comprising:
for each of the plurality of sections, generating corresponding metadata that describes content of the specific section.

16. The system of claim 9, wherein the first customized document and the central document are stored in a central database.

17. The system of claim 9, wherein the central document is stored in a central database and the first customized document is stored on a system that is local to the first user.

18. The method of claim 12, wherein the first customized document and the central document are stored in a central database.

19. The method of claim 12, wherein the central document is stored in a central database and the first customized document is stored on a system that is local to the first user.

20. The computer readable medium of claim 1, further comprising:
maintaining and storing a table for the central document, wherein the table comprises all rights for the central document.

* * * * *

UNITED STATES PATENT AND TRADEMARK OFFICE
CERTIFICATE OF CORRECTION

| | |
|---|---|
| PATENT NO. | : 8,370,628 B2 |
| APPLICATION NO. | : 12/503986 |
| DATED | : February 5, 2013 |
| INVENTOR(S) | : Mundy et al. |

It is certified that error appears in the above-identified patent and that said Letters Patent is hereby corrected as shown below:

On the title page, in column 2, Item (56) under "Other Publications", line 6, delete "Managment" and insert -- Management --, therefor.

On the title page, in column 2, Item (56) under "Other Publications", line 9, delete "Documentss" and insert -- Documents --, therefor.

On the title page, in column 2, Item (56) under "Other Publications", line 14, delete "htm." and insert -- html. --, therefor.

On title page 2, in column 2, Item (56) under "Other Publications", line 1, delete "Servces" and insert -- Services --, therefor.

In the Specification:

In column 4, line 23, before "flow" delete "is a".

Signed and Sealed this
Seventh Day of May, 2013

Teresa Stanek Rea
*Acting Director of the United States Patent and Trademark Office*